March 8, 1927.

R. R. BEAL ET AL 1,620,318

HIGH FREQUENCY ARC CONVERTER

Filed Jan. 9, 1922   3 Sheets-Sheet 1

WITNESS
H. Sherburne

INVENTORS
H. F. ELLIOTT
R. R. BEAL.
BY
their ATTORNEYS

March 8, 1927.

R. R. BEAL ET AL 1,620,318

HIGH FREQUENCY ARC CONVERTER

Filed Jan. 9, 1922    3 Sheets-Sheet 3

WITNESS
H. Sherburne

INVENTORS
H. F. ELLIOTT and
R. R. BEAL.
BY
White Prost Evans
their ATTORNEYS

Patented Mar. 8, 1927.

1,620,318

UNITED STATES PATENT OFFICE.

RALPH R. BEAL AND HAROLD F. ELLIOTT, OF PALO ALTO, CALIFORNIA, ASSIGNORS, BY MESNE ASSIGNMENTS, TO FEDERAL TELEGRAPH COMPANY, OF SAN FRANCISCO, CALIFORNIA, A CORPORATION OF CALIFORNIA.

HIGH-FREQUENCY ARC CONVERTER.

Application filed January 9, 1922. Serial No. 528,070.

The invention relates to arc converters for producing high frequency current and particularly radio frequency current and particularly to converters for converting an alternating current of low frequency, for instance an audio frequency, into a current of radio frequency. The invention relates further to arc converters of the Poulsen type in which the arc is formed in a magnetic field and in an atmosphere containing hydrogen or a functionally equivalent substance. The usual method of operating the arc converter is to supply it with direct current of suitable voltage, and the arc, by reason of its unstable characteristics converts the direct current into a radio frequency alternating current. We have found, that it is possible to employ an arc converter for generating radio frequency current from an audio frequency alternating current supply, as for example, the standard 60 cycle alternating current or the 500 cycle alternating current.

An object of the present invention therefore, is to provide an arc system for converting an audio frequency alternating current into a radio frequency current.

The invention possesses other advantageous features, some of which, with the foregoing, will be set forth at length in the following description, where we will outline in full, that form of the invention which we have selected for illustration in the drawings accompanying and forming part of the present specification. In said drawings, we have shown several embodiments of our invention, but it is to be understood that we do not limit ourselves to such forms, since the invention, as expressed in the claims, may be embodied in a plurality of other forms.

Referring to said drawings.

There are many advantages derived from the operation of arc converters with an alternating current supply. Electricity is almost universally distributed in the form of alternating current, so that the arcs may be operated from the service lines without the use of motor-generators or rectifiers. The elimination of these devices increases the over-all efficiency of the installation and reduces its cost. The ease with which alternating current can be supplied at any desired voltage by the use of transformers, is a further advantage. In the operation of arc converters, it is frequently necessary to use a relatively high supply voltage, and in direct current arcs, this renders the construction of the direct current generator difficult and expensive. With an alternating current supply, it is only necessary to select a transformer of the proper output voltage. Further advantages will appear hereinafter, wherein typical systems of operating arc converters on alternating current are outlined. It is to be understood that the systems shown are merely illustrative and that the invention is not limited to the systems shown. Many combinations of circuits and systems similar to those shown may be employed to accomplish the same purpose.

Figure 1:
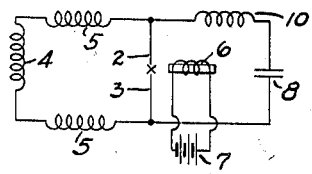
Figures 1, 2, 3 and 4 are diagrammatic representations of different forms of alternating current arc systems.

In Fig. 1, we have shown one form of alternating current arc converter system. The electrodes 2—3 of the arc are enclosed in a chamber containing an atmosphere containing hydrogen or other suitable gas. Power is supplied to the arc from an alternating current source 4, through suitable choke coils 5. The arc is subjected to a strong transverse magnetic field produced by the electromagnet 6, which, in this instance, is energized from a source of direct current 7. Connected across the arc is an oscillatory circuit containing inductance and capacity, these in the present instance being illustrated by the inductor 10 and the capacitance 8. When the arc is used in a radio signaling system, the oscillatory circuit may comprise the antenna circuit, wherein the capacitance consists of the antenna and the ground. When the arc is used for industrial purposes, such as for supplying radio frequency current for induction furnaces or other uses, the oscillatory circuit may assume other forms.

The choke coils 5, which serve to prevent the flow of radio frequency current to the alternating current source 4, which may be a transformer or an alternator, may be constructed either with an air core or with an iron core and in some instances may be combined with the winding of the source 4. The two electrodes 2—3 of the converter are preferably of the same material, usually either carbon or metal. The electrodes are preferably placed symmetrically with respect to the magnetic field, the strength of which is adjusted to secure maximum efficiency of the converter.

Figure 2:
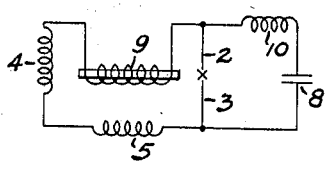
Figure 3:
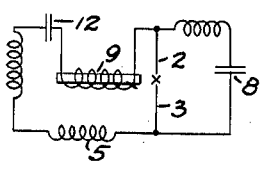
Figure 4:
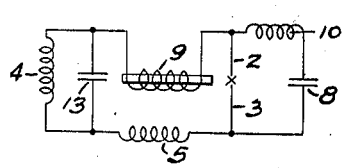

In the system shown in Fig. 2, the arc is subjected to an alternating magnetic field by arranging the electromagnetic winding 9 in series in the alternating current circuit. This causes the magnetic field to vary in intensity and direction directly in accordance with the intensity and direction of the alternating current through the arc, resulting in very steady operation and flexibility in arc adjustment. This system, however, results in low power factor, due to the reactance of the field winding. This condition may be compensated by the use of a capacitative reactance 12, in series in the alternating current circuit, as shown in Fig. 3. This circuit is particularly adapted for the operation of the arc converter at relatively high audio frequencies. Another method of correcting the power factor is shown in Fig. 4, wherein the capacitative reactance 13 is connected in parallel with the arc and its series field and choke coil. It is obvious that the capacitative reactance may also be used with alternating current arc converters having no series field but only choke coils.

Figure 5:
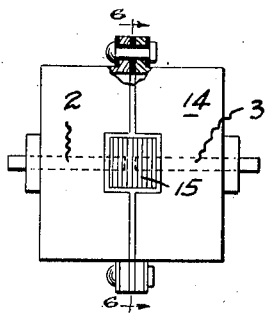
Fig. 5 is an end elevation of one form of alternating current arc converter.
Figure 6:
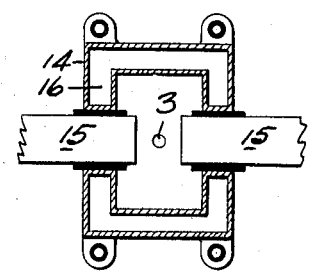
Fig. 6 is a section taken on the line 6—6, Fig. 5.

In Figs. 5 and 6, we have shown a form of arc converter particularly adapted to a series alternating current magnetic field. The converter comprises a casing 14, preferably formed of metal, into which the field poles 15 extend and in which the arc is formed in the proper atmosphere between the electrodes 2 and 3. When a metal casing is employed, it is formed so that it does not become, in effect, a short circuited turn around the field poles where they project through the casing. This may be accomplished by forming the casing in two halves and insulating the halves from each other for the relatively low voltage which results in a single turn placed around the magnetic circuit. The poles 15 are formed of laminations to minimize the losses therein and are insulated from the casing which is preferably formed of a non-magnetic material, such as bronze, and which is cooled by flowing a cooling liquid through the water jacket 16 in the casing.

Figure 7:
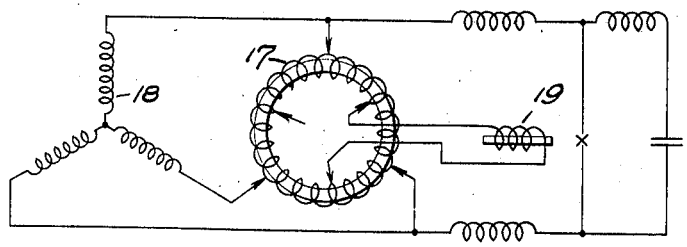
Fig. 7 is a diagrammatic representation of an alternating current arc system arranged to provide the proper phase relation between the current through the field winding and the current through the arc.

The field winding of an alternating current arc converter with an alternating current magnetic field may also be arranged for shunt or separate excitation in synchronism with the current through the arc. When the magnetic field winding is not in series with the arc supply current, it is necessary that means be provided for maintaining the current through the field winding in the proper phase relation to the current through the arc. One means of accomplishing this result is shown in Fig. 7, wherein a phase-rotating transformer 17 is provided, to which the polyphase source of supply 18 is connected and to which the shunt magnetic field winding 19 is connected. Any other means of securing a proper adjustment of phase relation of the field and arc currents may be employed.

Referring again to the systems shown in Figs. 1 to 4 inclusive, the radio frequency current in the oscillatory circuit, varies in amplitude in accordance with the frequency of the alternating current supply. When a single arc converter of the type shown in Fig. 1 is employed for radio telegraphy, the hum of the frequency of the alternating current supply will be heard at the receiving station. The effect is the same as that of the source of continuous undamped radio frequency oscillations modulated in accordance with the alternating current supply.

Figure 8:
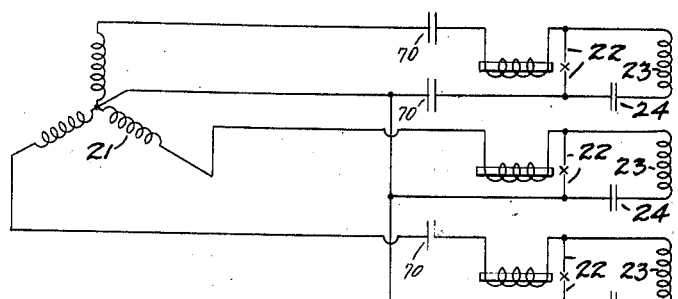
Fig. 8 is a diagrammatic representation of a polyphase alternating current arc system.

This condition may be obviated, practically, by the employment of a polyphase system instead of a single phase system, which produces a continuous undamped radio frequency current in the oscillatory circuit with negligible variation in amplitude from the alternating current supply. In Fig. 8, we have shown one form of polyphase system, wherein a three phase alternating current source of supply 21 is employed. A pair of electrodes 22 is connected across each leg of the source of supply 21, and each pair of electrodes is shunted by an oscillatory circuit containing an inductor 23 and a capacitance 24. The oscillatory circuits are all coupled to a common antenna circuit comprising the antenna 25, the inductor 26 and the coupling coils 27. Means are provided for synchronizing the radio frequency currents in the oscillatory circuits and this is accomplished in the system shown, by the circulatory current which flows through the coupling coils 27 and the inductor 28, arranged in a circuit connected across the three coupling coils. Other methods of interconnecting the circuits may also be employed for maintaining synchronism and the method shown is merely chosen as an illustration.

Figure 9:
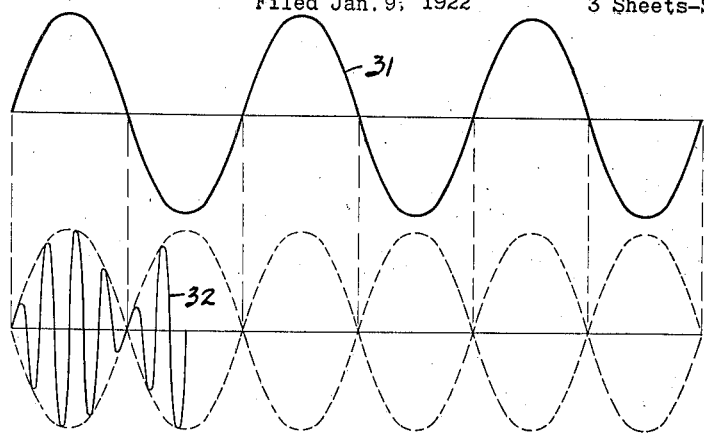
Fig. 9 is a graphical illustration of a single phase alternating current and the radio frequency current produced therefrom.
Figure 10:
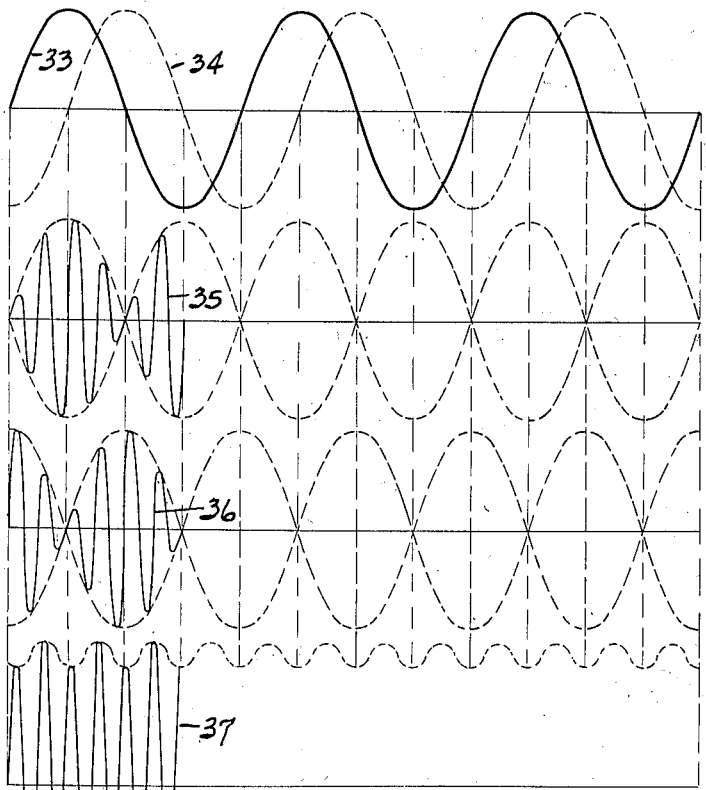
Fig. 10 is a graphical illustration of a two-phase alternating current and the radio frequency current produced therefrom.

The manner in which the oscillations vary in amplitude in the oscillatory current supplied by an arc converter operating on alternating current is shown in Fig. 9, in which curve 31 represents the variation in the supply voltage of the alternating current, which is assumed to be substantially a sine wave, and curve 32 shows diagrammatically the current in the oscillatory circuit. In Fig. 10, the results of combining in a single circuit, the oscillations produced by arc converters operating on a two-phase alternating current supply are shown diagrammatically. Two phases are chosen for illustration because of the simplicity of the diagrams, but it is to be understood that in practice any number of phases may be used and the currents combined in a similar manner. The curves 33 and 34 represent the variations in the supply voltage of the alternating current, curves 35 and 36 show diagrammatically, the currents in the oscillatory circuit due to the two-phase alternating current and curve 37 represents the combined or resultant oscillatory current in the oscillatory circuit.

Figure 11:
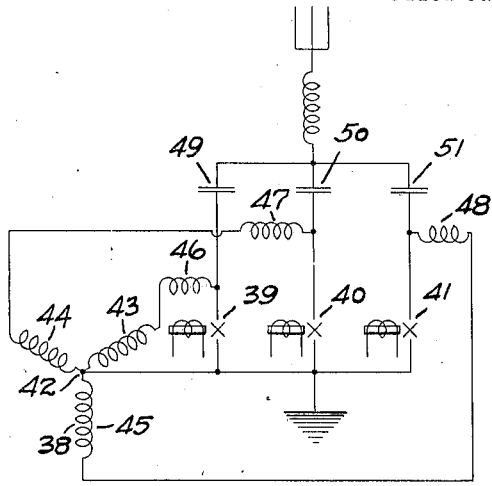
Figs. 11, 12, 13 and 14 show equivalent schemes of other forms for utilizing a multiplicity of phases in the antenna circuit.

It is possible to utilize polyphase energy for the antenna circuit in other ways than that shown in Fig. 8. For example, the arcs may be connected in parallel in the same load circuit, as shown in Fig. 11. In this figure the system is shown as three phase, supplied by an alternator 38, supplying an antenna circuit, and the arcs 39, 40 and 41 are each connected between a neutral point 42 and the extremities of the phase windings 43, 44 and 45, through the choke coils 46, 47 and 48. Each of the arcs forms a parallel path in the antenna circuit. In order that the currents through the arcs be maintained in synchronism, there may be utilized condensers or other impedances 49, 50 and 51 of a sufficiently high value so that slight variations in the arc impedance have but little effect upon the total impedance of the arc circuit. This means for synchronizing the three arcs is the invention of Harold F. Elliott and James Arthur Miller, and is described in an application filed Jan. 9, 1922, Serial No. 527,884 entitled Radiofrequency system.

Figure 12:
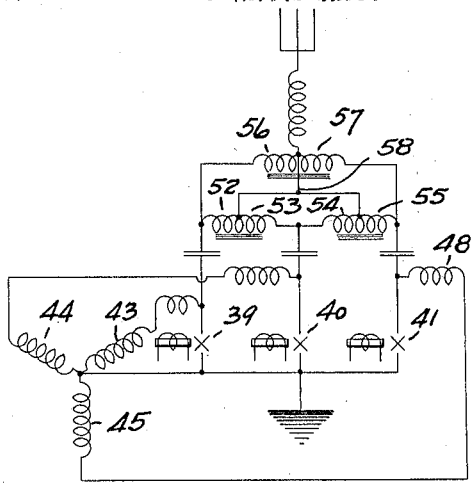

Fig. 12 shows another modification in which there is utilized, in addition, means for preventing the flow of cross currents between phases. This means may take the form of iron cored coils 52, 53, 54, 55 and 56, connected in pairs between the phases as shown, and in such a way that their magnetizing effects neutralize while the load is divided correctly between the phases. The connection points between the pairs of coils 70 are all joined to a common point 58 to which the antenna connects, as shown. This scheme for stabilizing a plurality of parallel paths is described and claimed in an application filed in the names of Harold F. Elliott and James Arthur Miller, filed Jan. 9, 1922, Serial No. 527,885 and entitled Radiofrequency system.

Figure 13:
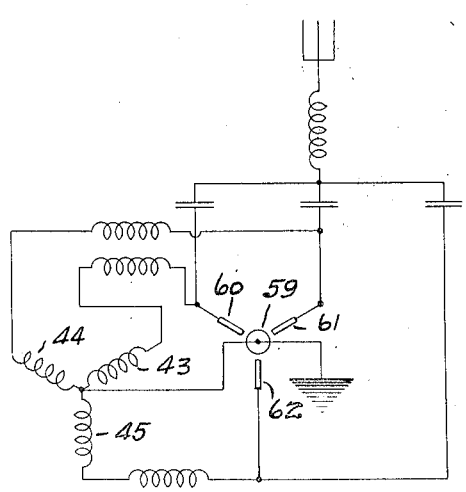

It is not essential that a pair of electrodes be used with each arc. A neutral electrode 59, shown in Fig. 13, may be utilized, common to all three arcs, which are formed between electrode 59 and electrode 60, 61 and 62. In other respects this figure is like Fig. 12. Any appropriate means may be provided for influencing the arcs magnetically.

Figure 14:
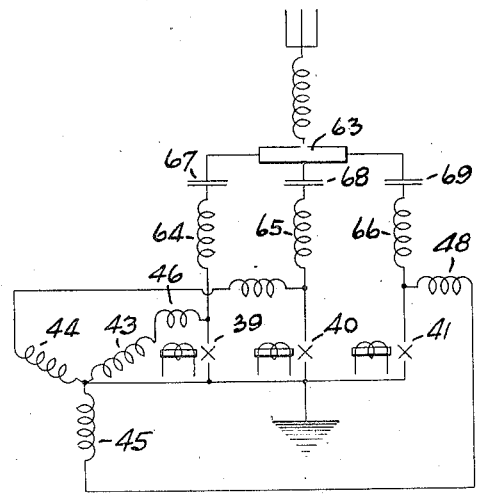

Fig. 14 shows another possible parallel arrangement of the arcs. Here the stabilizer 63 is shown diagrammatically only and is supposed to represent some such arrangement as illustrated in Fig. 12. Here each of the arcs 39, 40 and 41 has an inductor 64, 65 or 66 in series with it, as well as a capacitance 67, 68 or 69. The relative values of the inductive reactance and capacitive reactance are so chosen in each arc circuit that they neutralize each other for the frequency which it is desired to maintain. This arrangement is useful to damp out higher harmonics. This and other advantages of this connection are discussed at length in the applications hereinbefore identified. The various figures showing these schemes are here introduced for the sake of showing the various forms it is possible to use for operation of a plurality of arcs in the same system.

Means for correcting the power factor, such as the condensers 12 and 13 of Figs. 3 and 4, may also be used in the polyphase systems, and is indicated for example in Fig. 8 by the condensers 70.

For certain classes of radio communication the modulations produced by using an alternating current supply are desirable. For other classes they are unobjectionable and for still other classes they become objectionable. The question of whether single or polyphase alternating current supply should be used must, therefore, be decided in accordance with the conditions under which communication is to be established.

In the production of radio frequency current for purposes other than radio communication, for example, the operation of high frequency induction furnaces, the form of the wave of the radio frequency current is frequently of minor importance and the maintenance of a high effective value of radio frequency current is the important factor. Arc converters operating on either single or polyphase alternating current supply may, therefore, be used to advantage for industrial application as well as for radio communication.

We claim:

1. In an arc converter, a pair of electrodes, an alternating current magnet arranged to influence the arc formed between the electrodes, and a hollow casing enclosing the arc, through which casing the magnet extends, said casing comprising insulated halves, whereby no alternating current can be induced in the casing by the variations in the flux of the magnet.

2. In an arc converter, a split casing, electrodes disposed in said casing, an alternating current magnet arranged to influence the arc formed between the electrodes, the portions of said split casing being insulated from each other whereby no alternating current can be induced in the casing by the variations in the flux of the magnet.

3. An apparatus for producing alternating currents of high frequency, comprising electrodes between which an arc is formed, means for supplying an alternating electric current thereto, means for subjecting said arc to an alternating current magnetic field, means for controlling the phase of the field current with respect to the phase of the supply current, and a circuit including said electrodes, an inductance and a capacitance.

4. In an arc converter, a plurality of electrodes, means for supplying a plurality of pairs of the electrodes with a polyphase alternating current, these electrodes being so arranged that any of them may be used either as a cathode or an anode as regards the cooperating electrode, whereby each pair operates as an alternating current arc, an oscillation circuit, means whereby all of the arcs supply the oscillation circuit, and means for synchronizing the oscillations of the arcs.

5. In a high frequency arc converter, means for producing a plurality of oscillating arcs, said arcs being connected in series relation as regards the load circuit, a load circuit supplied by the arcs, and means, separate from said circuit, for synchronizing the oscillations.

6. In an arc converter, a source of polyphase alternating current, a plurality of arcs energized from said source by currents differing in phase, an oscillation circuit, means whereby all of the arcs supply the oscillation circuit, and additional means for synchronizing the oscillations of the arcs.

7. In an oscillation generator, a source of polyphase alternating current, a plurality of high frequency generator elements energized from said source by currents differing in phase, an oscillation circuit, means whereby all of the generator elements supply the oscillation circuit, and additional means for synchronizing the oscillations of the generators.

In testimony whereof, we have hereunto set our hands.

RALPH R. BEAL.
HAROLD F. ELLIOTT.